Jan. 8, 1963    H. MOESTA ETAL    3,071,968
PRESSURE GAUGES
Filed Feb. 4, 1959
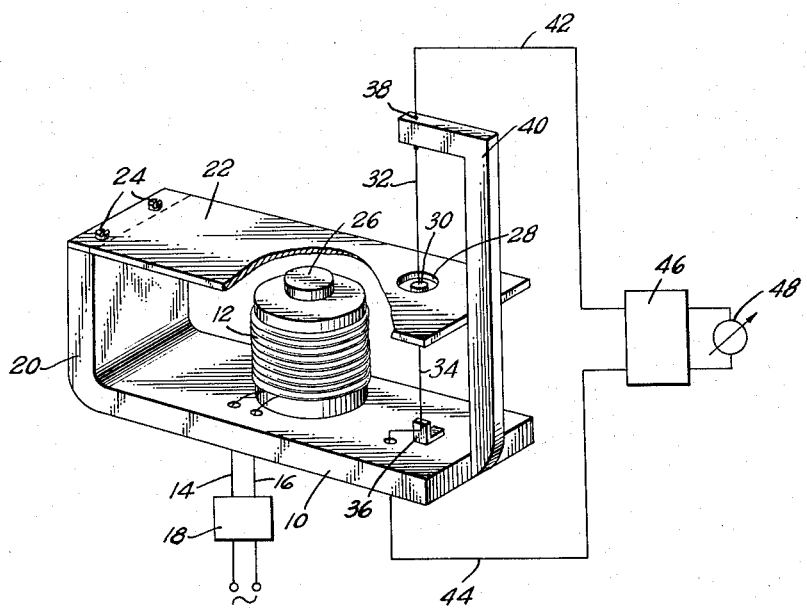
INVENTORS
Hasso Moesta
Peter Herrwerth
BY  *Oliver W. Hayes*
ATTORNEY

United States Patent Office 3,071,968
Patented Jan. 8, 1963

3,071,968
PRESSURE GAUGES
Hasso Moesta, Koln-Weidenpesch, and Peter Herrwerth, Bonn-Wichelshof, Germany, assignors to National Research Corporation, Cambridge, Mass., a corporation of Massachusetts
Filed Feb. 4, 1959, Ser. No. 791,129
Claims priority, application Germany Feb. 22, 1958
2 Claims. (Cl. 73—399)

This invention relates to pressure gauges and more particularly to the thermal conductivity type.

Pressure gauges based on the measurement of thermal conductivity of gases generally have an upper limit in the region of 1 to 100 mm. Hg abs. In the higher pressure regions the conductivity of gas does not vary sufficiently with the pressure.

Accordingly, it is the principal object of this present invention to provide a thermal conductivity gauge which will permit measurements of high pressures.

Other objects of the invention will in part be obvious and will in part appear hereinafter.

Known pressure gauges of the thermal conductivity type have a limited range of use. They are incapable of satisfactory operation in measurement of pressures in excess of 100 mm. Hg abs., because at such high pressures the constant gas conduction accounts for nearly all of the heat loss and the relatively low temperature attained by the heating element in such gauges is independent of pressure. Because of the relative simplicity, low cost and ease of handling thermal conductivity gauges, it is desirable to extend the measuring range to higher pressures on the order of one atmosphere.

In order to accomplish this increased measuring range, it has been proposed to use a blower which produces a current from the surrounding gaseous medium. Since the current produced by such blower is dependent on pressure, the produced gaseous current and resulting cooling effect on the heating element would enable measurements of higher pressures. The use of the proposed blower, however, would be of great disadvantage. For example, the blower and driving motor would, if necessity, be placed in the vacuum chamber since the blower is extremely sensitive to external disturbances. In addition, it is difficult to keep the driving power of the blower constant, this being necessary for accurate measuring, without using extensive means. In enclosing the driving motor of a blower in a vacuum chamber, the limited lifetime of the small motors used presents a further disadvantage.

The present invention concerns a thermal conductivity gauge in which there is at least one heated element arranged in a gas flow so that the heat of the element will be altered by the gas pressure present. The principal feature of the invention consists in the use of at least one vibratory element which produces the gas flow about the heated element. The vibratory form preferably consists of a partially ferromagnetic leaf spring containing an aperture on one end, the other end being attached to a supporting frame. The supporting frame contains an electromagnet which is energized by alternating current. The heated element is stationary and positioned in the aperture of the vibratory element.

In general, the vibratory motion produced by the leaf spring and electromagnet can be controlled over wide ranges of frequency and amplitude by means well known in the art. For example, if vibrations of a lower frequency are desired, a polarized armature piece may be used.

As the heated element there may be used, for example, a semiconductor with a high temperature coefficient or a metallic element of a resistance thermometer. It is understood that the production of vibrations is by no means confined to electromagnetic effects. For instance, an electromagnetic piezoelectric or mechanical means may be employed. Moreover, it may be advantageous to fix the heated element to the vibratory form to be mobile together with it.

In a preferred embodiment of the invention, a semiconductor pearl is attached as the heated element by supporting wires so that it is positioned in the aperture of the vibratory element. The semiconductor pearl is then arranged with a bridge connection known in the art so that it may be heated to a constant temperature. The gas flow produced by the vibratory element lowers the temperature of the heated element by convection. The amount of heat necessary to maintain the constant temperature depends on the heat loss from the gas flow which in turn is dependent on the pressure. Thus the pressure is measured in this manner. Below a pressure of about 20 mm. Hg abs., the invention performs as a heat conduction manometer since the cooling effect of the gas flow produced by the vibratory element is negligible. Above 20 mm. Hg abs., there is a cooling effect of the heated element produced by the vibratory element and resulting gas flow. In this way the invention has a measuring range from approximately $10^{-2}$ mm. Hg. abs., to atmospheric pressure.

Referring now to the drawing which is a schematic illustration, a magnetic coil 12 is fixed on a supporting frame 10 and the junctions 14 and 16 of the magnetic coil 12 are connected to stabilizing apparatus 18. At the free leg 20 of the supporting frame 10 there is fixed a ferromagnetic leaf spring 22, by means of screw connections 24, and which can be vibrated by the alternating magnetic condition of the coil armature 26. At the free end of the ferromagnetic leaf spring 22, a circular aperture 28 is provided in which there is a semiconductor pearl 30, which is positioned by using thin holding wires 32 and 34 between a point of support 36 at the frame 10 and an attachment point 38 at a carrying piece 40. The attachment point 38 and the point of support 36 are, via leads 42 and 44, connected with the indicator gauge 46, and the amount of current through indicator gauge 46 is indicated by a measuring apparatus 48. The indicator gauge 46 includes a bridge connection (not shown) which is constructed in a manner known to the art so that the resistance of the semiconductor pearl 30 and of the holding wires 32 and 34 may be kept constant by appropriate alterations of the heating power. Consequently, the heated element which is sensitive to temperature and which is composed of a single element can be kept at a constant temperature, and from the point of practicability, this temperature is to be fixed above the highest occurring temperature of the environment. The instrument 48 measures any excess over the heating current which is necessary for the maintenance of a certain temperature of the heated element.

While a preferred embodiment has been described, other forms of construction may be used. For example, two vibratory elements may be employed. Rather than measuring the resistance of the heated element, means for measuring the temperature of the heated element can be provided as the pressure indication, in the manner of a usual thermocouple gauge.

A thermal conductivity gauge as described can, because of its simple construction, be placed in a separate container and then connected to a vacuum chamber or it can be placed directly within a vacuum chamber.

Since certain changes can be made in the above without departing from the scope of the invention herein involved, it is intended that all matter contained in the above description or shown in the accompanying draw-

What is claimed is:

1. A pressure measuring gauge wherein variations in pressure of the surrounding gaseous medium vary the heat dissipation by conduction from a heated surface and thereby vary its temperature, means for heating said surface, a vibratory element having an extended surface, said extended surface being positioned immediately adjacent said heated surface, means to actuate said vibratory element whereby vibration of the extended surface creates a flow of said gaseous medium past said heated surface to remove heat from said heated surface at a rate which is a function of the pressure of the gaseous medium and means for indicating the change of resistance with temperature of said heated surface as a measure of the pressure.

2. A pressure measuring gauge wherein variations in pressure of the surrounding gaseous medium vary the heat dissipation by conduction from a heated surface and thereby vary its temperature, means for heating said surface, a vibratory element consisting of a leaf spring, said leaf spring being positioned immediately adjacent said heated surface, means to actuate said vibratory leaf spring whereby vibration of the leaf spring creates a flow of said gaseous medium past said heated surface to remove heat from said heated surface at a rate which is a function of the pressure of the gaseous medium, and means for indicating change of resistance with temperature of said heated surface as a measure of the pressure.

References Cited in the file of this patent

UNITED STATES PATENTS 2,152,243  Daiger _____ Mar. 28, 1939

FOREIGN PATENTS 308,595  Switzerland _____ Oct. 1, 1955

OTHER REFERENCES

Article: "Wide-Range Thermistor Vacuum Gauge" by P. E. Seiden, The Review of Scientific Instruments, vol. 28, No. 8, August 1957. (Photostat in 73–399.)